2,515,250

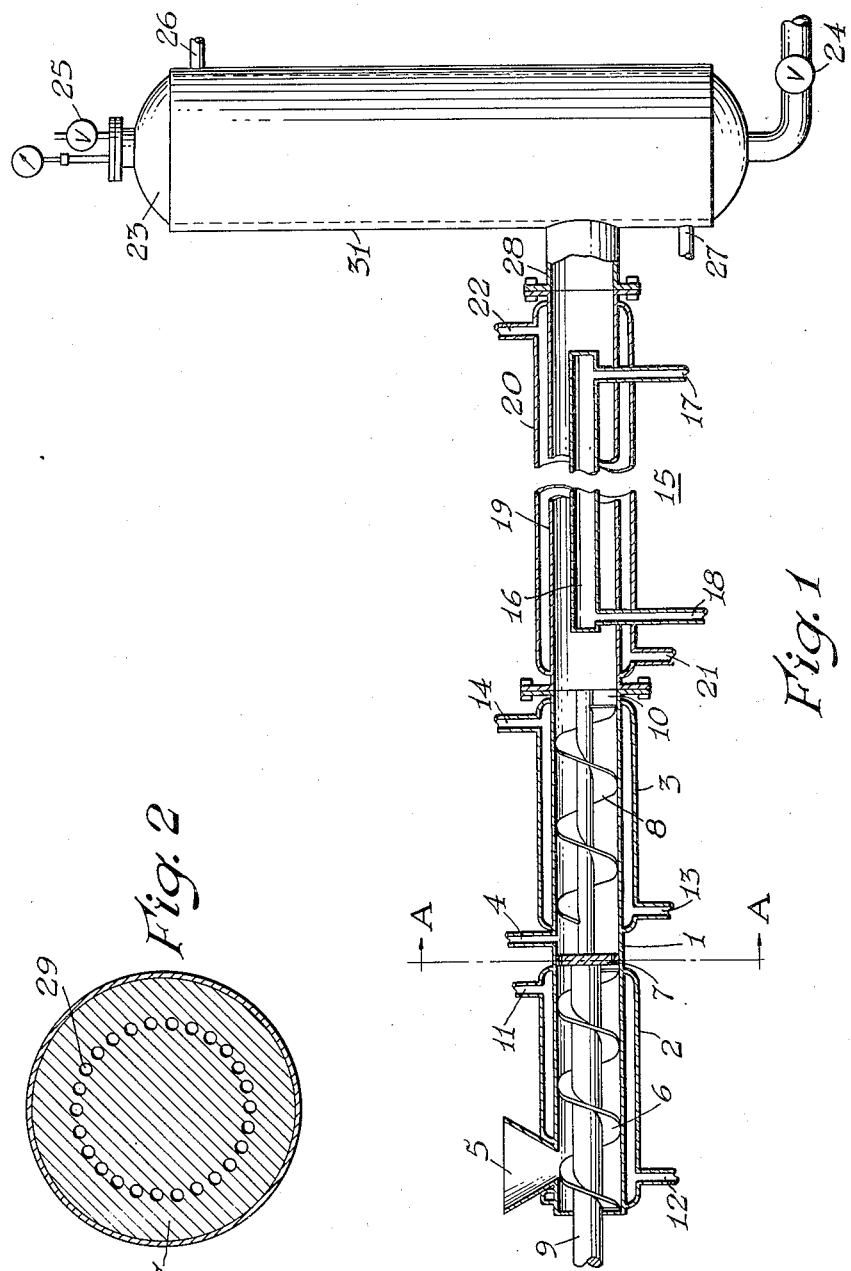
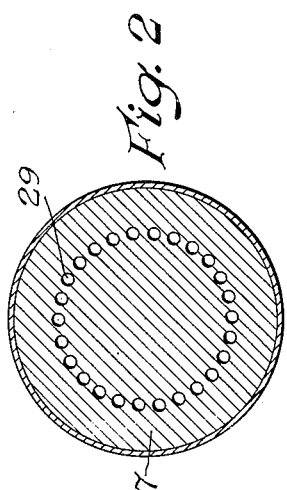
Fig. 1
Fig. 2
INVENTOR.
Otis Ray McIntire
BY
Griswold & Burdick
ATTORNEYS Patented July 18, 1950

UNITED STATES PATENT OFFICE 2,515,250

METHOD OF MAKING AND STORING COMPOSITIONS COMPRISING THERMOPLASTIC RESINS AND NORMALLY GASEOUS SOLVENTS

Otis Ray McIntire, Midland, Mich., assignor to The Dow Chemical Company, Midland, Mich., a corporation of Delaware Application November 7, 1947, Serial No. 784,618

5 Claims. (Cl. 18—47.5)

1

This invention concerns an improved method for dissolving under pressure normally gaseous agents in thermoplastic resins, e. g. to form flowable gels which, on release of the pressure, undergo expansion with formation of a mass of individually-closed, thin-walled cells. It pertains especially to the preparation of such gels in a continuous manner which permits control as to the composition of the gel and the temperature at which it is formed. It pertains more particularly to the preparation of a mobile gel of polystyrene having a normally gaseous agent such as methyl chloride dissolved therein.

In the Munters U. S. Patent 2,023,204 it is disclosed that a cellular mass of polystyrene may be formed by heating a mixture of pulverized polystyrene and methyl chloride in a closed vessel at about 30 atmospheres pressure and at the melting point, i. e. about 170° C., of the polymer, and thereafter opening a bottom valve to permit extrusion of the solution which is formed. During extrusion, the polystyrene becomes swollen to a cellular mass due to vaporization of the dissolved methyl chloride.

This known method, although operable in forming small rods, e. g. of less than 0.5 inch diameter, of a cellular product, is inconvenient to practice and requires modification for production of larger cellular masses. For instance, in producing cellular masses of greater than 2 inches minimum linear dimension it is important that the solution of thermoplastic resin and normally gaseous agent, e. g. methyl chloride, be at a temperature below the critical temperature of said agent when the pressure is released and that the dissolved agent be present in amount such as to be vaporized substantially completely on release of the pressure with consequent cooling, due to its heat of vaporization, of the resin to a temperature not more than 10° C. above, and preferably below, the second order transition temperature of the resin, as measured by the method of Boyer et al., Journal of Applied Physics, vol. 15 p. 398, 1944. If the normally gaseous agent is dissolved in a proportion smaller or greater than just stated, the cellular resinous product usually collapses shortly after being formed.

The operations of dissolving, under pressure in a closed vessel, a predetermined proportion of a normally gaseous agent in a thermoplastic resin at a temperature suitable for the extrusion, or of forming the gel at a different temperature and thereafter bringing it to said temperature, are difficult and time-consuming, e. g. it frequently takes from three days to a week in order to carry

2 out these operations. Furthermore, during extrusion of the resultant gel, the latter tends to cling to inner walls of the vessel and funnel downward so that vapors escape through the bottom discharge valve when a large amount, e. g. one-third or more, of the gel remains in the vessel. A portion of the remaining gel can be discharged satisfactorily by immediately closing the extrusion valve when gas escapes, letting the system stand to permit drainage of gel from inner walls of the vessel and again opening the valve. However, care must be observed during the extrusion and also during recharging of the vessel that the vapor pressure inside the vessel does not decrease sufficiently to permit appreciable expansion to a cellular mass of the gel remaining in the vessel. If these precautions are not observed, extra steps for removal of the cellular material may be required in order to permit satisfactory re-employment of the vessel in the process.

It will be evident from the foregoing that manufacture of the cellular resinous masses would be simplified and rendered less time-consuming and less costly by provision of a method for rapidly forming under pressure, and bringing to a desired temperature a solution of a predetermined proportion of a normally gaseous agent in a thermoplastic resin. It is an object of this invention to provide such a method, and also an apparatus permitting practice of the method in a continuous manner. Another object is to provide for injection of the solution into a storage vessel as it is formed and to provide for extrusion of the resultant resin gel from the vessel so as to form a cellular mass of the resin. Other objects will be evident from the following description of the invention.

I have found that solutions of normally gaseous agents in thermoplastic resins may be prepared readily and in a continuous manner by passing the molten resin under pressure through one or more restricted orifices into a mixing zone, simultaneously feeding a normally gaseous agent, capable of being dissolved by the resin, into the mixing zone, stirring the mixture and forwarding it under pressure through a temperature regulating zone where it is brought to a temperature below the critical temperature of the agent and also below the boiling point of said agent at the pressure applied to the system, and forwarding the solution from the temperature regulating zone to a pressure-resistant storage vessel. By regulating the relative rates of flow of the resin and normally gaseous agent to the system, a solution containing a predetermined amount of the normally gaseous agent may readily be produced. The solution is preferably stored under pressure, e. g. for from 3 to 24 hours, so as to form a bed of a substantially uniform mobile gel of the resin, prior to being discharged from the storage vessel for expansion to a cellular mass.

Normally gaseous agents which may be employed in practice of the invention are soluble or at least partially soluble in the thermoplastic resin under the conditions of temperature and pressure employed to carry out the process. Among such compounds are: methyl chloride, ethyl chloride, dischlorodifluoromethane, methyl ether, ethyl ether, methyl ethyl ether, and normally gaseous olefines such as propylene, butylene, etc. Cracked-oil gas fractions containing as the principal components such gaseous olefines are particularly useful. Mixtures of the normally gaseous agents may be used, if desired.

The accompanying drawing is a diagrammatic sketch showing an arrangement of apparatus suitable for use in practice of the invention. The apparatus comprises an extruder, a heat exchanger, and a pressure-resistant storage vessel provided with a valved outlet near its bottom.

The extruder comprises a jacketed casing having a feed opening, a discharge opening, and an inlet located in an intermediate position between said openings for addition of the normally gaseous agent. The casing encloses a screw feeder comprising a single unit and consisting of a feed screw section, a perforated plate situated in an intermediate section of the extruder across the bore of the latter so as to restrict flow of material through the extruder, and a blending and forwarding screw section and means for driving said screw feeder.

The heat exchanger comprises three concentric pipes forming a double annulus. The ends of the innermost pipe are closed and openings are provided for circulation of heating or cooling media therethrough. Openings are also provided in the outermost pipe for similar passage of heating or cooling liquids or vapors. The intermediate pipe is attached at its ends to the extruder and to the pressure-resistant storage vessel and forms a passageway for flow of material.

The pressure-resistant storage vessel may be of any conventional design capable of withstanding a working pressure of about 500 pounds per square inch absolute or higher. Openings are provided in the bottom for feeding material into the vessel and for discharge of the material accumulating therein. Other openings are provided in the top for controlling the pressure. The temperature is controlled by passing steam or water or other heating or cooling medium through the jacket.

Referring now to the drawing:

Figure 1 is a schematic general view of the apparatus partly in section.

Figure 2 shows a face of the perforated plate situated inside the extruder along the lines AA.

The casing 1 of the extruder is jacketed in two sections, 2 and 3. The jacket 2 allows heat to be applied by circulating hot oil or other heating medium through openings 11 and 12 to melt the solid thermoplastic resin fed into the extruder through the hopper and feed opening 5. The jacket 3 permits cooling of the mixture of molten thermoplastic resin and normally gaseous agent in the mixing zone by passage of water or other cooling medium through the jacket via openings 13 and 14. The inlet 4 is provided for adding the normally gaseous agent under pressure to the molten thermoplastic resin in the mixing zone of the extruder. The extruder connects with the heat exchanger 15. The hopper and feed opening 5 are conventional in devices of this character.

The screw feeder comprises the screws 6 and 8 and the perforated plate 7 on a common shaft 9 and is adapted to fit closely within the casing 1. The screw feeder may be driven by any conventional means, e. g. an electric motor operating a gear assembly connected to the shaft 9.

The screw 6 in the feed section is usually a single flight screw of uniform pitch, as shown, but a feed screw of different design, e. g. having multiple flights or a tapered pitch, may be used. The screw 6 compresses the molten thermosplastic resin and forces it under pressure through the openings in plate 7. The plate 7 is positioned ahead of inlet 4 and consists of a disc-like enlargement of the screw feeder having a diameter slightly less than the inside diameter of the casing, e. g. from 0.006 to 0.010 inch less, and contains a number of small openings 29. The size and number of the openings will depend upon the rate of flow through them per unit of time and the viscosity of the molten thermoplastic resin. The openings should be of a size sufficient to allow the molten plastic to flow through the same without causing excessive pressure in the extruder casing. They should not be so large as to prevent the molten plastic flowing therethrough from forming a plastic seal sufficient to overcome the vapor pressure of the subsequently added normally gaseous agent. I have found openings having a diameter of from $\frac{1}{16}$ to $\frac{1}{4}$ inch to be operable in practice of the invention. Larger openings may be used, but for most thermoplastic resins openings of the sizes just stated are preferred.

A plastic seal effective to prevent countercurrent leakage of gas may be formed in ways other than that just described in detail. For instance, an orifice to be sealed against gas leakage by the flow of plastic therethrough may be of a shape or design other than that of the perforated plate 7, e. g. such disc-like enlargement of the screw feeder may be non-perforated but be of smaller diameter than shown in the drawing so that molten plastic flows over the same as a thin sheet and into the mixing zone of the extruder. A plastic seal may also be formed without employment of a restricted orifice by forcing molten plastic under pressure through a pipe into a mixing zone to which a normally gaseous agent also is fed. Such plastic seal may be formed by employing a gear pump to withdraw a molten thermoplastic resin from a vessel and force it under pressure into the mixing zone. In all instances, the pressure applied to force the molten thermoplastic resin into the mixing zone is greater than the pressure of the normally gaseous agent and molten plastic at the point of feed of the normally gaseous agent to said zone.

The screw 8 in the blending and forwarding section may also be a uniform pitch single flight screw as shown, but screws of other designs may be used. The screw 8 preferably has a greater forwarding capacity than the feed screw so as to carry the combined volume of thermoplastic resin and added normally gaseous agent, and prevent possible development of an excessive pressure inside the extruder. The screw 8 may have a capacity from 5 to 50 per cent greater than the feed screw 6 depending upon the proportion of normally gaseous agent employed. It is preferred to use a forwarding screw 8 having a capacity slightly greater than the combined volume of the thermoplastic resin and liquefied normally gaseous agent so as to forward the mixture rapidly from the point of addition of said agent. Such increased capacity may be obtained in usual ways, e. g. by deepening the flights or increasing the pitch of the screw 8, relative to the flight or pitch of screw 6.

The flights of the screw 8 are cut away for a short distance adjacent to the plate 7 so that there is no wiping action of the flights across the opening 4 to force molten plastic into the opening and cause it to become plugged. The screw 8 mixes and blends under pressure the normally gaseous agent with the molten thermoplastic resin and forwards it into the heat exchanger while at the same time the mixture is cooled to a temperature preferably below the critical temperature of the normally gaseous agent employed.

Heat exchanger 15 contains an inner pipe 16 which has closed ends. Pipes 17 and 18 serve as an inlet and outlet to permit circulation of heating or cooling liquids through pipe 16. The outermost pipe 20 forms a jacket around pipe 19. Pipe 20 is provided with an inlet and outlet, 21 and 22, for passing heating or cooling media through the jacket. The intermediate pipe 19 forms a continuation of the extruder and is attached to an inlet 28 to the storage vessel 23.

The apparatus provides for continuous formation within the extruder of a mobile gel of resinous material and a dissolved normally gaseous agent and for delivery of the gel from the extruder, through the temperature regulating zone and into the pressurized storage vessel. The mobile gel is forced through the heat exchanger by pressure exerted on the mass by the forwarding screw 8 in the mixing zone of the extruder. In passing through the heat exchanger the mobile gel is conditioned by cooling so that it discharges into the storage vessel under pressure as a homogeneous composition of substantially uniform temperature.

The resinous gels of thermoplastic resins and a normally gaseous agent are poor heat transfer agents. It, therefore, requires a considerable time to cool a mass of the mobile gel from the molten temperature of the thermoplastic resin to a lower temperature, e. g. of from 60° C. to 120° C. Such cooling can be accomplished only by a gradual decrease in temperature, e. g. by prolonged storage of the mass at a predetermined temperature or by slowly passing the material through a temperature regulating zone wherein excess heat is gradually dissipated. When rapid cooling is attempted, the gel becomes difficultly flowable and may form a film of solid thermoplastic resin on inner surfaces of the container. The solid resins are poor conductors of heat, hence, the formation of such film on the cooling surfaces renders cooling of the mass even more difficult.

Efficient cooling of the mobile gel may be accomplished by making the heat exchanger of dimensions such that a time of several hours, e. g. from 2 to 5 hours or longer, is required for a complete change of the material in the heat exchanger at a maximum rate of feed from the extruder.

The pressure-resistant storage vessel 23 is provided with a discharge valve 24, a valved inlet or outlet 25 for controlling the vapor pressure, a feed inlet 28 and a jacket 31 having an inlet and outlet, 26 and 27, for passing steam, water, or other heating or cooling medium therethrough. The storage vessel may be a tank capable of withstanding a working pressure of about 500 pounds per square inch, absolute, or more. I prefer to use a jacketed pressure-resistant vessel having a height of from 3 to 5 times its diameter. The resinous gel is continuously formed and fed under pressure into the storage vessel 23. It may advantageously be maintained in the vessel under pressure at a predetermined temperature for periods of from 3 to 24 hours or longer prior to being discharged from the storage vessel for expansion to a cellular mass. Such storage results in an improvement in the quality, e. g. uniformity, of the cellular product. The period of storage permits escape of any entrapped uncondensed gas, e. g. air, and settling of the gel to form a bed thereof. The gel may also become of more uniform composition during storage.

When putting the process into operation solid thermoplastic resin is fed to the extruder. After sufficient resin has been added to seal the holes of the perforated plate, a small amount of a high boiling solvent, preferably a solvent having a boiling point near or above the melting point of the thermoplastic resin, such as o-dichlorobenzene, diethylbenzene, 2-ethylxylene, isopropylbenzene, or the like, is added to the molten plastic in the mixing zone of the extruder so as to form a plastic plug flowable at the lower temperatures employed in the heat exchanger. During, or immediately after, addition of the solvent the extruder is operated so as to fill, or nearly fill, the mixing zone of the extruder. The system is then pressurized by adding vapors of a normally gaseous agent, or a vapor mixture of such agent and carbon dioxide, air, nitrogen, or the like, to the storage vessel 23, e. g. through inlet 25, so as to produce a back pressure on the flowable plug which prevents vapors of the normally gaseous agent from flashing through the heat exchanger into the storage vessel before the heat exchanger becomes filled with the resinous gel. After formation of the flowable plastic plug of high boiling solvent and thermoplastic resin and pressurizing of the system, the normally gaseous agent may then be fed under pressure at a desired rate to the molten thermoplastic resin in the mixing zone of the extruder.

The following specific description illustrates a way in which the process of the present invention may be employed, but is not to be construed as limiting the scope thereof.

An extruder and heat exchanger, having the essential features just described and shown in the accompanying drawing, was attached to a side-inlet to a lower section of a jacketed pressure-resistant storage vessel. The vessel was provided with a valved opening at the bottom for discharge of material accumulated therein. Solid polystyrene in a granular form was fed into the extruder at a rate of 200 pounds per hour and heated to its melting point by circulating hot oil through the jacket of the feed section of the extruder. After sufficient molten polystyrene had been forced through the perforated plate to form a plastic seal, 2 pounds of o-dichlorobenzene were added, during a period of 10 minutes, to the molten plastic in the mixing zone of the extruder so as to form a flowable plastic plug which nearly filled the mixing zone of the extruder. The system was then pressurized by adding methyl chloride vapors and gaseous carbon dioxide to the storage vessel until the pressure was 350 pounds per square inch absolute. Methyl chloride was then added under pressure to the molten polystyrene in the mixing zone of the extruder at a rate of 32 pounds per hour by means of a positive displacement metering pressure pump. The screw in the blending and forwarding section of the extruder had a carrying capacity 17.5 per cent greater than the capacity of the screw in the feed section. The mixture of polystyrene and methyl chloride was cooled from the temperature of the molten polystyrene, i. e. about 180° C., to a temperature of 137° C. as it was forwarded to the heat exchanger. Cooling was accomplished by passing water at 35° C. through the jacket of the mixing section of the extruder. The heat exchanger was 40 feet long and held on inventory of about 1200 pounds of the composition. In passing through the heat exchanger, the mobile gel of polystyrene and methyl chloride was further cooled from a temperature of 137° C. to a temperature of 95° C. as it was discharged into the pressurized storage vessel. The cooling was effected by passing water at 85° C. through the jacket and the innermost pipe of the heat exchanger. The temperature of the composition was maintained at 95° C. by circulating hot water through the jacket of the storage vessel. The pressure on the storage vessel increased as it gradually filled with the mobile gel because of compressing the carbon dioxide gas used to pressurize the system at the start of the operation. The pressure was allowed to rise to 450 pounds per square inch. Thereafter vapors were vented from the vessel as necessary to maintain a substantially constant pressure. After operating the process for 24 hours, accumulated composition gel was extruded from the bottom outlet of the vessel and expanded without shutting down the process. There was obtained 3500 pounds of solid cellular polystyrene. The composition was a homogeneous mass before expansion, as shown by the uniformity and excellent quality of the cellular product. Operation of the process was continued and after another 20 hours accumulated polystyrene-methyl chloride composition was again extruded and expanded. There was obtained 4500 pounds of polystyrene foam. The process as just described may be continued over as long a period as desired.

The method of the present invention may be used to prepare homogeneous compositions of volatile solvents and other thermoplastic products such as the polymers and copolymers of styrene, ortho-chlorostyrene, para-chlorostyrene, isopropylstyrene, ortho-ethylstyrene, para-methylstyrene, dichlorostyrene, alpha-methylstyrene, methylmethacrylate and vinyl chloride, and the like. Such thermoplastic resinous products may be prepared by polymerizing the monomeric compounds individually, or in admixture with one another.

Other modes of applying the principle of my invention may be employed instead of those explained, change being made as regards the methods or products herein disclosed, provided the steps or compounds stated in any of the following claims or the equivalent of such stated steps or compounds be employed.

I claim:

1. A method of making a homogeneous composition of a thermoplastic resin and a normally gaseous agent which comprises the steps of feeding a molten thermoplastic resin to a mixing zone at an applied pressure such as to form within the inlet to said zone a plastic seal against appreciable counter-current leakage of gas from the mixing zone, feeding a resin-soluble normally gaseous agent at superatmospheric pressure and in continuous manner into admixture with the thermoplastic resin in the mixing zone, agitating the mixture of thermoplastic resin and normally gaseous agent under pressure while cooling the mixture to a temperature at which it remains flowable and such that the normally gaseous agent is in non-gaseous form at the pressure thus applied to the mixture, and charging the resultant composition into a vessel where it is stored at a pressure sufficient to maintain the composition as a solution of the normally gaseous agent and resin.

2. A method of making a homogeneous composition of a thermoplastic resin and a normally gaseous agent which comprises the steps of pressing a thermoplastic resin while heating to its melting temperature, forming a plastic seal by continuously forcing the molten thermoplastic resin under pressure through a restricted orifice into a mixing zone so as to seal the orifice against appreciable counter-current leakage of a gas therethrough, feeding a resin-soluble normally gaseous agent at superatmospheric pressure into admixture with the molten thermoplastic resin entering the mixing zone, agitating the mixture of thermoplastic resin and normally gaseous agent under pressure while cooling the mixture to a predetermined temperature at which it remains flowable but below the critical temperature of the normally gaseous agent and such that the normally gaseous agent is in non-gaseous form at the pressure thus applied to the mixture, and charging the resultant composition into a vessel where it is stored at a pressure sufficient to maintain the composition as a solution of the normally gaseous agent and resin.

3. A method of making homogeneous compositions of the benzene-soluble thermoplastic polymers and copolymers of monovinyl aromatic compounds having a vinyl group attached directly to a carbon atom of the aromatic nucleus and a normally gaseous agent comprising the steps of heating the thermoplastic resin to its melting temperature, forcing the molten thermoplastic resin under pressure and in continuous manner through a restricted orifice into a mixing zone so as to seal the orifice against appreciable counter-current leakage of a gas therethrough, feeding a resin-soluble normally gaseous agent at superatmospheric pressure into admixture with the molten thermoplastic resin entering the mixing zone, agitating the mixture of thermoplastic resin and normally gaseous agent under pressure while cooling the mixture to a temperature at which it remains flowable but below the critical temperature of the normally gaseous agent and such that the normally gaseous agent is in non-gaseous form at the pressure thus applied to the mixture, and charging the resultant composition into a vessel where it is stored at a pressure sufficient to maintain the composition as a solution of the normally gaseous agent and resin.

4. A method of making a homogeneous composition of polystyrene and a normally gaseous agent which comprises the steps of heating polystyrene to its melting temperature, forcing the molten polystyrene under pressure and in continuous manner through a restricted orifice into a mixing zone so as to seal the orifice against appreciable counter-current leakage of a gas therethrough, feeding a resin-soluble normally gaseous agent at superatmospheric pressure into admixture with the molten polystyrene entering the mixing zone, agitating the mixture of polystyrene and normally gaseous agent under pressure while cooling the mixture to a temperature at which it remains flowable but below the critical temperature of the normally gaseous agent and such that the normally gaseous agent is in non-gaseous form at the pressure thus applied to the mixture, and charging the resultant composition into a vessel where it is stored at a pressure sufficient to maintain the composition as a solution of the normally gaseous agent and resin.

5. A method of making a homogeneous composition of polystyrene and methyl chloride which comprises the steps of heating polystyrene to its melting temperature, forcing the molten polystyrene under pressure and in continuous manner through a restricted orifice into a mixing zone so as to seal the orifice against appreciable counter-current leakage of gas therethrough, feeding methyl chloride at superatmospheric pressure into admixture with the molten polystyrene entering the mixing zone, agitating the mixture of polystyrene and methyl chloride under pressure while cooling the mixture to a temperature between 90° C. and 100° C., and charging the mobile gel of polystyrene and methyl chloride into a pressurized storage vessel.

OTIS RAY McINTIRE.

REFERENCES CITED

The following references are of record in the file of this patent:

UNITED STATES PATENTS

| Number | Name | Date |
| --- | --- | --- |
| 2,023,204 | Munters et al. | Dec. 3, 1935 |
| 2,207,426 | Bailey | July 9, 1940 |
| 2,273,188 | Graves | Feb. 17, 1942 |
| 2,278,875 | Graves | Apr. 7, 1942 |
| 2,378,539 | Dawihl | June 19, 1945 |
| 2,409,910 | Stober | Oct. 22, 1946 |
| 2,424,750 | Heckert | July 29, 1947 |